United States Patent [19]

Knapp

[11] Patent Number: 4,525,894
[45] Date of Patent: Jul. 2, 1985

[54] HANDLE FOR A SINGLE-CONTROL MIXER VALVE AND THE LIKE

[75] Inventor: Alfons Knapp, Biberach an der Riss, Fed. Rep. of Germany

[73] Assignee: Masco Corporation, Taylor, Mich.

[21] Appl. No.: 481,663

[22] Filed: Apr. 4, 1983

[30] Foreign Application Priority Data

Apr. 26, 1982 [IT] Italy .................. 67547 A/82

[51] Int. Cl.³ .................................. B25G 1/10
[52] U.S. Cl. ..................... 16/111 R; 16/DIG. 24; 16/DIG. 30; 16/114 R
[58] Field of Search ............... 16/110 R, 111 R, 112, 16/114 R, 121, DIG. 30, DIG. 41, 123, DIG. 24; 74/543, 545, 552, 558.5; 137/607, 625.17, 636–636.4

[56] References Cited

U.S. PATENT DOCUMENTS

| 2,199,129 | 4/1940 | Hamilton | 137/607 X |
| 3,313,057 | 4/1967 | Leddy | 16/121 X |
| 3,382,733 | 5/1968 | Miller et al. | 74/543 |
| 3,472,283 | 10/1969 | Christiansen | 137/636.3 |

FOREIGN PATENT DOCUMENTS

852532 9/1970 Canada .................. 137/636.2

Primary Examiner—James M. Meister
Attorney, Agent, or Firm—Steven L. Permut; Malcolm L. Sutherland; Leon E. Redman

[57] ABSTRACT

A handle for a single-control mixer valve, having an outer control lever and an inner actuating lever connected together by an inner connection member fastened to the inner actuating lever and provided with a threaded bore. A cap is mounted onto the connection member and a bore located so as to correspond to the threaded bore of the connection member. A fastening screw integral with the control lever, is screwed into the threaded bore of the connection member and fixes to both the control lever and the cap to the connection member. The cap is provided with a seat to receive an ornamental element made of natural or imitation onyx, sodalite or other valuable material, which results in being easily replaceable. The parts are fastened together with no visible fasteners and ensure an easy disassembly for reaching the inner parts of the valve for repair, disassembly or maintenance purposes.

10 Claims, 4 Drawing Figures

HANDLE FOR A SINGLE-CONTROL MIXER VALVE AND THE LIKE

TECHNICAL FIELD

This invention relates to a device for mutually connecting the inner actuating lever and the outer control lever of a single-control mixer valve.

DISCLOSURE INFORMATION

Certain types of single-control mixer valves have a short inner actuating lever to which an outer control lever is to be connected. The control lever has a larger extension and forms an angle with the inner lever in order to be located in a position convenient for its actuation. Usually, the connection is achieved by means of a cap which also serves to cover the inner lever and the cover of the mixer valve mechanism. For the connection of the cap to the inner lever, the use of a simple screw passing from the top through the cap is often not accepted for aesthetical reasons, since the screw is visibly obtrusive at the upper surface of the cap. The cap in certain cases is furthermore decorated with a disc applied thereon, made of an ornamental material, such as onyx, sodalite or else. In such cases, the connection of the cap is made by means of screws situated in positions which become accessible only in particular positions of the control lever. However the concealed screw is not fully satisfactory either from the aesthetical point of view or because it involves difficulties of access thereto. In any case it gives rise to considerable structural complications.

The disc of ornamental material is often permanently secured onto the cap, and should a breaking or a damaging take place, or should one desire to replace the ornamental disc, it is practically necessary to substitute the entire valve or a considerable portion thereof.

SUMMARY OF THE INVENTION

According to the present invention, a device for mutually connecting the inner actuating lever and the outer control lever includes a connection member provided with coupling means for rigidly connecting it to the inner actuating lever and with a threaded bore for mounting the outer control lever. A cap is mounted onto said connection member and is provided with a bore corresponding to said threaded bore of the connection member. A fastening screw for fixing the outer control lever is screwable into said threaded bore of the connection member and passes through said bore of the cap whereby the fastening screw which fixes the control lever also fixes the cap to the connection member.

The device connects the inner actuating lever and the outer control lever in a single-control mixer valve with no connecting members visible from the outside. The handle is simple and economical to manufacture, technically reliable, and allows the maximum freedom of design for the aesthetical appearance of the valve. A connection device of this type allows simple and quick replacement of an ornamental cap without the necessity of substituting other parts of the valve. Still another object of the invention has the further advantage of easy and quick disassembly operations.

The connection member intended to be fixed to the inner lever may easily be manufactured by pressing, or even by molding from plastics. A screw may connect the connection member to the inner lever. The connection member, once installed, does not need to be disconnected even for access to the valve mechanism of the mixer valve. The cap has the simplest possible structure, it does not require to be inserted onto the connection member and it does not show any connection means outside. The cap may be given any shape with the most ample freedom for aesthetical purposes and it may be decorated, if desirable, with ornamental elements applied thereon. The cap and lever are fixed to the connection member by screwing the fastening screw of the lever. This screw may be integral with the lever itself, be a separate element onto which the lever is inserted, or it may serve to fix a support member onto which the lever is mounted, preferably in such a manner as to completely or partially conceal the fastening screw.

According to an aspect of the invention, the cap has a downwardly facing seat for receiving a decorative element which thus, after the assembling has been achieved, remains trapped between the cap and the inner connection member. The decorative element may be provided with a complementary flange which abuts the seat. Alternatively, it may be glued onto a support member, defining therewith the complementary flange. This support member is particularly advantageous when the decorative element is made of a hard material, such as onyx, which is difficult material for making an undercut thereon to provide the outwardly extending flange.

Preferably, the inner connection member is made of plastic and is provided with a metal insert for receiving the fastening screw of the control lever.

BRIEF DESCRIPTION OF THE DRAWINGS

These and other characteristics and advantages of the present invention will be more apparent from the following description of some embodiments given by way of non-limiting examples and diagrammatically shown in the accompanying drawings in which.

DETAILED DESCRIPTION OF THE PREFERRED EMBODIMENTS

Figure 1:
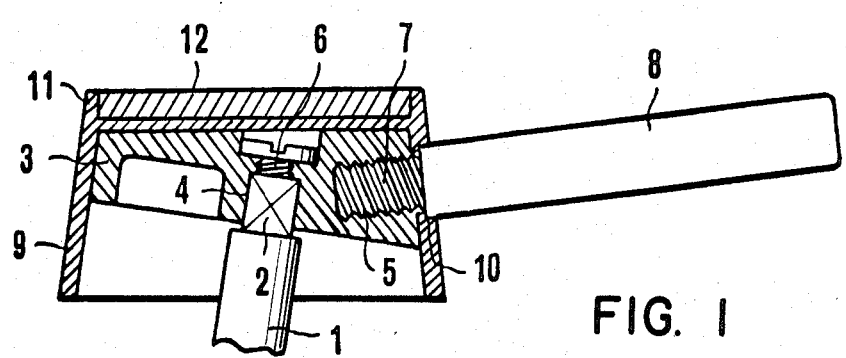
FIG. 1 is a side elevational and segmented view taken along the plane defined by the axes of the inner actuating and the outer control levers of a first embodiment of the connection device, provided with a decorative element firmly applied on the cap.

Referring now to FIG. 1, an inner actuating lever of a single-control mixer valve, is provided with a square upper section 2 and an inner threaded bore for inserting a connection member 3 for the outer control lever 8. The connection member 3 is provided with a central opening 4, which in the present case is square, for non-rotatably mounting it onto the actuating lever 1 and to fix it thereon by means of a simple axial screw 6. In addition, connection member 3 has a threaded bore 5 for a screw 7 which, in this case, is integral with an end of the outer control lever 8 of the valve. The axes of the levers 1 and 9 generally form a non-right angle between them in order that the levers be positioned in technically and practically preferable positions. The connection member 3 may be moulded, preferably from plastics, which renders very easy its manufacture to provide the non-right angles of the levers 1 and 8. The threaded bore 5 may be obtained by the moulding process, or it may also be initially smooth. In this case screw 7 is a self-threading screw. The piece 8, instead of being the visible control lever, may also be a simple mounting stem onto which the control lever is mounted.

Prior to the screwing of the screw 7, a cap 9 is mounted onto the connection member 3. The cap 9 has an inner cavity which is shaped to receive the connection member 3. The cap 9 has an aperture 10 which, when the cap is mounted on the connection member 3, coincides with the threaded bore 5 of the member 3. Besides these necessary characteristics, the cap 9 may be shaped in any desirable manner and may be made of any suitable material. In particular, its upper surface (which covers and conceals the fastening screw 6 fixing the connection member 3 on the actuating lever 1) may be finished in any desired manner, smooth or decorated. In particular the cap 9 may be provided, with a rim 11 within which there may be inserted an ornamental plate 12 made of a valuable material or an imitation thereof, such as a natural or imitation onyx, sodalite, ceramic, plastics and so on. The plate 12 is permanently glued in the seating defined by the rim 11. In case of having to replace this plate, it will be sufficient to substitute the cap 9 with another cap provided with a new or different ornamental plate 12, without having to substitute any other part of the valve, such as the connection element 3 and the lever 8. Moreover, the replacement can be carried out easily and quickly.

The simple operation of extending the screw 7 of lever 8 through the bore 10 of the cap 9 and screwing it into the bore 5 of the connecting member 3 assembles all the mentioned parts and obtains the connection between the levers 1 and 8 and the desired appearance of a valve which does not show any visible fastening member. The desired appearance is obtained without compromising in any way the practicality of the assembling and disassembling operations. It is to be noted that by unscrewing the lever 8 and removing the cap 9, an ample access to the underlying parts of the valve is obtained which allows many repair and maintenance operations to be carried out without having to detach the connection member 3 from the lever 1.

Figure 2:
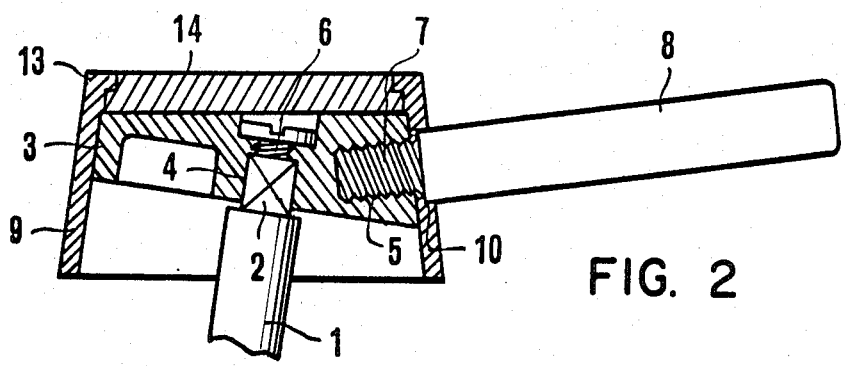
FIG. 2 is a similar view of a second embodiment, in which the decorative element is replaceable without having to substitute the cap.

According to FIG. 2, the cap 9, instead of having a rim 11 which simply defines the seat for the ornamental plate 12, has a rim 13 with an undercut or downwardly facing seat 13a. In this case, the ornamental plate 14 also has a corresponding peripheral undercut or flange 14a and may therefore be inserted into the cap 9. The flange 14a abuts seat 13a and the plate 14 is effectively retained in place; between the connection member 3 and cap 9. Plate 14 may easily be replaced without having to substitute the cap by detaching the cap 9 from the connection member 3.

Figure 3:
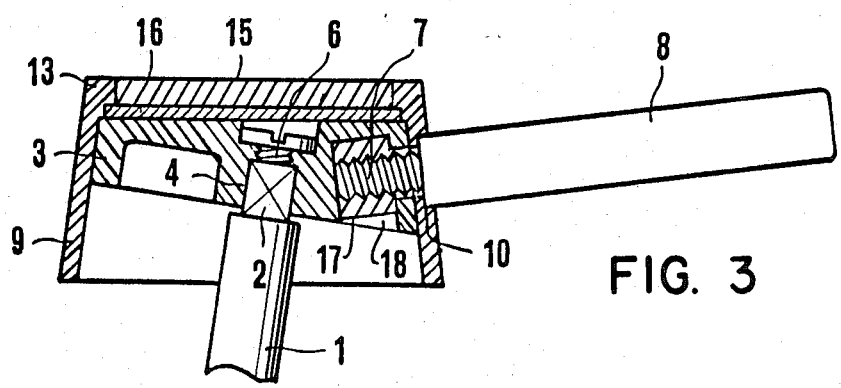
FIG. 3 is a similar view of the third embodiment with a replaceable decorative element in the cap and a metal insert in the connection member.

Since in certain cases the material forming the ornamental plate is not fit for being machined to have a flange or undercut, the plate may be formed, as shown in FIG. 3, by glueing a simple disc 15 of a valuable material onto an underlying larger disc 16 made of any material. The disc 16 serves as a support and provides the flange 16a at an outer edge thereof that abuts the seat 13a in rim 13 of the cap 9.

The embodiment shown in FIG. 3 has a metal insert 17 provided with the threaded bore 5 (it may be a simple screw nut) inserted into a cavity 18 of the connection member 3. This ensures, in an economical way, a high resistance of the coupling of the laver, even in case of a connection member 3 made of a low resistance material.

Figure 4:
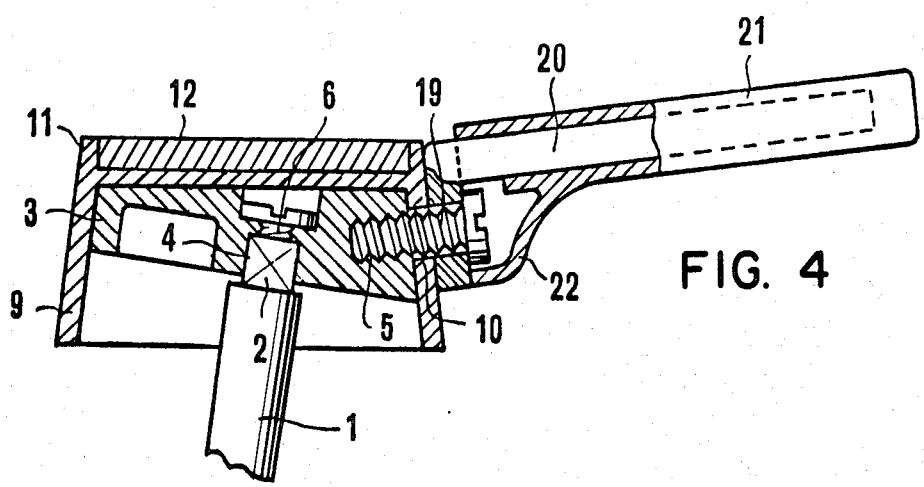
FIG. 4 is a similar view of a fourth embodiment in which the fastening screw carries a support on which the control lever is applied in such a manner as to cover the fastening screw.

The embodiment shown in FIG. 4, has a fastening screw 19 for fixing a support member 20, in this case a bracket member, onto which the lever 21 is mounted. By means of its protruding portion 22 the lever 21 covers the head of the screw 19 which, in case of need, may be reached by removing the lever 21 from the support 20. Alternatively, the protruding portion 22 of the lever could be provided with a bore allowing direct access to the screw 19.

Different modifications may be made to the arrangements described hereinabove. For instance, plates 12, 14 or 15, instead of occupying the entire upper surface of the cap 9, could be made to occupy only a minor portion thereof, and eventually be shaped and/or formed by a plurality of parts joined together or separated from each other. The metal insert 17 could be replaced by an insert made of a high resistance synthetic resin, and/or be incorporated during the moulding of the connection member 3, instead of being inserted into a cavity after the moulding of member 3. The means for inserting and fixing the connection member 3 to the inner level 1 may be of any type and may include, for example, a claw clutch, a radial pressure screw, and so on. The relative positions of axes of the levers 1 and 8 may also vary in accordance with constructional and installation requirements.

These and other modifications, may be made without departing from the spirit of the invention and the scope of the present patent defined by the appended claims.

The embodiments of the invention in which an exclusive property or privilege is claimed are defined as follows:

1. A single-control mixer valve handle having an inner actuating lever and an outer control lever and a connecting device; said connecting device characterized by:
   a connection member provided with coupling means for rigidly connecting it to the inner actuating lever and with a threaded bore for mounting the outer control lever;
   a cap insertable onto said connection member and provided with a bore corresponding to said threaded bore of the connection member; and
   a fastening screw for fixing the outer control lever, screwable into said threaded bor of the connection member and passing through said bore of the cap, whereby the fastening screw which fixes the outer control lever also fixes the cap to the connection member.

2. A connection device as defined in claim 1, characterized in that said connection member is made of molded plastics.

3. A connection device as defined in claim 2, characterized in that said bore for the fastening screw of the control lever is obtained in smooth form by a molding process, and in that the fastening screw is a self-threaded screw.

4. A connection device as defined in claim 2 characterized in that the connection member has an insert of a higher resistance material, said insert having said threaded bore therein; and said insert being inserted into a cavity of the connection member.

5. A connection device as defined in claim 1, characterized in that said cap has at least one seat for the seating of at least one ornamental element.

6. A connection device as defined in claim 5, characterized in that said seat for an ornamental element has rims provided with a shoulder for retaining the ornamental element between said rim and connection member of the connection device.

7. A connection device as defined in claim 6, characterized in that the ornamental element is rigidly secured onto a support plate of larger dimensions which provides therewith a flange that abuts said shoulder.

8. A connection device as defined in claim 1, characterized in that the fastening screw is provided at an end of the control lever.

9. A connection device as defined in claim 1, characterized in that said fastening screw fixes a support member on which there is mounted the control lever having a protruding portion disposed in such a way as to at least partially conceal said fastening screw.

10. A connection device as defined in claim 2 characterized in that the connection member has an insert of a higher resistance material, said insert having said threaded bore therein; and said insert being incorporated into said connection member during molding of said connection member.

* * * * *